Patented Aug. 5, 1924.

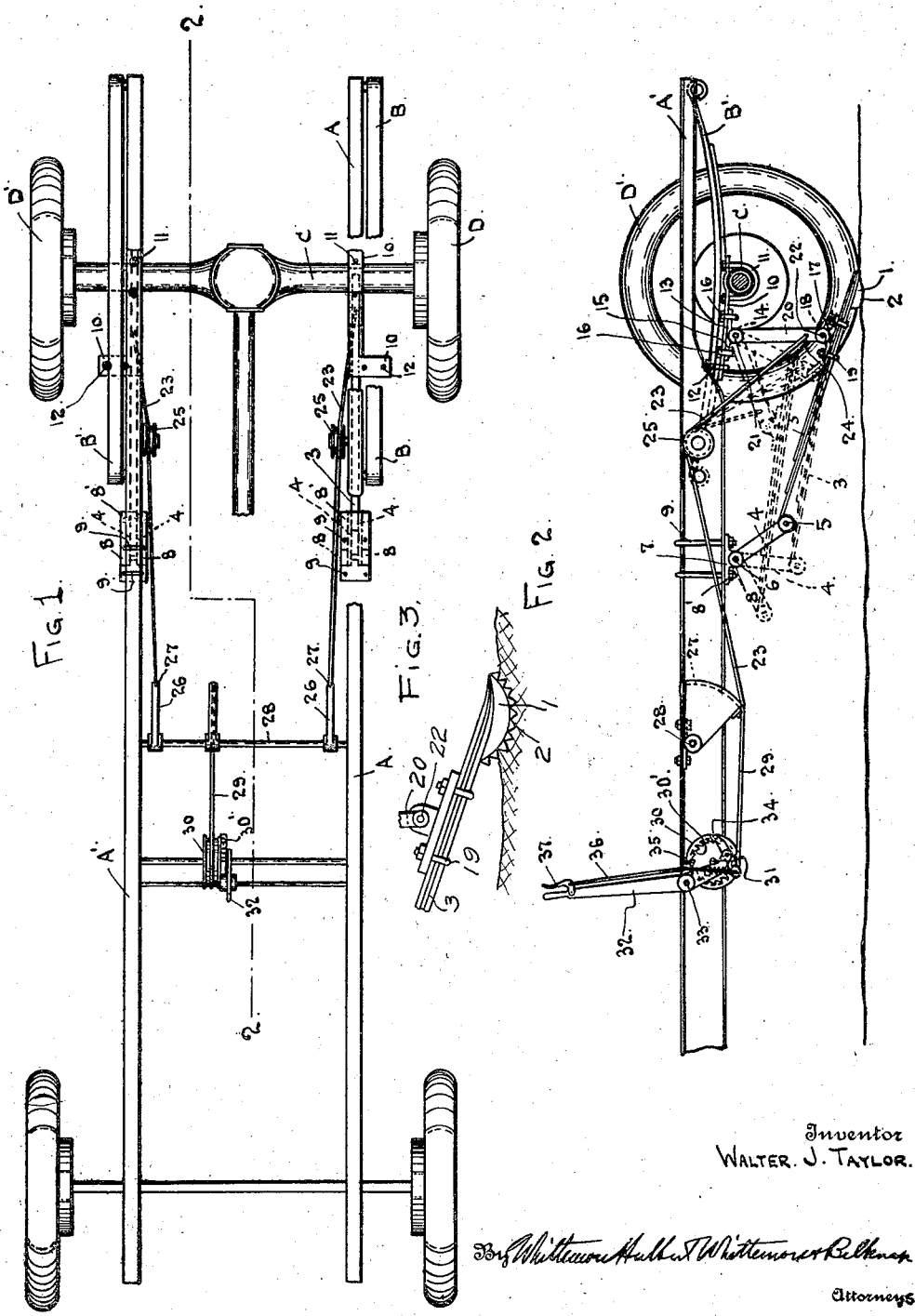

1,503,522

UNITED STATES PATENT OFFICE.

WALTER J. TAYLOR, OF DETROIT, MICHIGAN.

EMERGENCY OR AUXILIARY BRAKE.

Application filed October 2, 1922. Serial No. 591,902.

*To all whom it may concern:*

Be it known that I, WALTER J. TAYLOR, a citizen of the United States of America, residing at Detroit, in the county of Wayne and State of Michigan, have invented certain new and useful Improvements in Emergency or Auxiliary Brakes, of which the following is a specification, reference being had therein to the accompanying drawings.

This invention relates to emergency or auxiliary brakes for vehicles and has among other objects the provision of a simplified and inexpensive device of the character referred to composed of adjustably mounted parts which may be quickly and easily attached to any standard type of vehicle chassis. It is also an object to provide a gravity operated brake which when locked in operative position will prevent unauthorized driving of the car in a forward direction. Another object is to provide an emergency brake which will stop a car traveling at high speed much more quickly than other brakes now in use and which will absorb to a great extent any jolting occasioned by the sudden stop. A further object is to provide a brake which will prevent skidding or slipping of the vehicle when applied on a slippery traction surface. Other features and advantages of the present invention are more fully described by reference to the accompanying drawings wherein:—

Figure 1 is a top plan view of a vehicle chassis to which my invention is applied;

Figure 2 is a cross section on the line 2—2 of Figure 1.

Figure 3 is an enlarged view of the metallic shoe shown in Figure 2.

In detail A and A' represent the parallel side members of a standard vehicle chassis and B and B' the rear springs mounted outside the frame members. C is the housing for the driven axle and D and D' are the driven wheels. While I employ two braking devices parallelly disposed under the side members A and A' respectively the method of operation and means of attachment are identical and consequently the detail description of one will suffice to understand the invention.

My invention comprises a metallic shoe, preferably of semicircular shape, designated by reference character 1 and provided with ground engaging prongs 2 along its curved outer face. The inner face of this shoe is secured underneath and at one end of a leaf spring 3 by any suitable means, such as screws or the like. 4 represents parallel spaced links between the ends of which the free end of the spring 3 is journalled at 5. The opposite ends of these links 4 are in turn pivoted at 6 to a bearing member 7. This bearing member comprises parallel spaced ears 8 depending from an integral body portion 8' disposed at right angles thereto and adapted to be secured to the bottom of the frame member A' preferably by U-bolts 9 as this form of attachment provides for adjustment of the bearing along the frame member in locating the desirable position originally. 10 is an L-shaped bracket secured by U-bolts 11 to the axle housing C directly under and extending parallel with the frame member A'. The right angled portion of this L-shaped bracket extends outward under the spring B' and is secured thereto by U-bolts 12. As thus connected, any upward pressure or force exerted thereon will be communicated directly to the axle housing and spring tending to lift the wheels from the ground. This bracket 10 forms a support for a bearing member 13 similar to bearing 7 except that it has a single depending flange 14, the body portion 15 lying flush with the underside of bracket 10 and secured by U-bolts 16. A similar bearing 17 provided with a single flange 18 is secured to the upper side of the spring 3 adjacent the shoe end and by means of U-bolts 19. These U-bolt fastenings are desirable in that they insure the proper positioning of a forked connecting arm 20 pivotally connected at 21 and 22 to the bearing flanges 14 and 18 respectively. This forked arm carries practically all of the weight of the spring and shoe and is preferably slightly inclined to the vertical or past dead center when the brake is operating, see Figure 2. The spaced links 4 which are in substantial alignment with the arm 20 are somewhat shorter than the latter and tend to hold the spring 3 in an inclined position exerting a pull thereon while the braking shoe is engaging the ground. The arm 20 on the other hand when the brake is in operative position, as shown in Figure 2, is permitted by the pull exerted by the links 4 to swing slightly over dead center in which position it has a tendency to push or force the wheels upward off the ground.

Normally the spring and brake shoe are carried in the raised position shown in dotted lines in Figure 2. To raise the same to this inoperative position I employ a lifting cable 23 attached to the forked arm 20 adjacent its lower edge at 24. This cable passes upward and over a pulley 25 journaled to the inside of the frame A' and to the lower portion of a segmental arm 26 which has the grooved face 27 for receiving the cable when rocked. As shown in Figure 1, there are three of these segmental arms non-rotatably mounted upon a rockable shaft 28 extending between the side members A and A'. These segmental arms may be keyed to said shaft at any suitable place but are preferably positioned, as illustrated in Figure 1. The intermediate segmental arm has a short cable 29 secured to the upper end thereof, which cable extends forward to a winding drum 30 rotatably mounted upon a shaft 31 which is also secured to the side members A and A' but slightly below and forward of the shaft 28. This drum 30 is provided with rachet teeth 30' around its periphery and is rotated by means of a lever 32 fulcrumed adjacent thereto at 33. A dog 34 tends to rotate the drum when the lever 32 is moved back and forth and a locking dog 35 holds the same against reverse movement. 36 designates a common tripping means for the dogs 34 and 35 which will throw both dogs out of engagement with the teeth 31 when the gripping member 37 is pressed toward the handle of the lever 32. By back and forth movement of the lever 32 the cable 29 may be wound upon the drum 30, which action will rock the intermediate segmental arm, and consequently the arm 26 which in turn draws the cable 23 forward a considerable distance due to the grooved face swinging downward. This pulling of the cable forward swings the arm 20 forward and upward on its pivot 21 and in like manner swings the links 4 forward on their pivot 6 till the spring reaches the dotted position shown in Figure 1.

When driving along and it is desired to stop quickly, as in case of emergency, it is only necessary to grip the handle of the lever 32 and the member 37 forcing the latter thereagainst. This act will simultaneously disengage both dogs and permit the drum to rotate in a reverse direction. The cable being released the weight of the spring, shoe, bearing 17 and arm 20 will then cause the shoe to automatically drop into operative position, as shown in Figure 2. In operative position the upper end of the spring 3 is exerting a pull on the links 4 which determine its rearward movement while the forked arm 20 which is just past dead center transmits the stresses or thrusts from the shoe upward and forward to the spring B' and axle housing C, thus tending to raise the wheels off from the traction surface. As the same action takes place at the same time on both sides of the vehicle all slipping or skidding is avoided and the vehicle will be brought to a halt in remarkably short order. Tests have demonstrated that a motor car traveling at the rate of thirty miles per hour may be brought to a dead stop within twenty feet and without skidding, while it is preferable to adjust the brakes to operate less effectively. The adjustable mounting of the various parts in the original assembly provides for determing to a practical degree the severity of the braking effect.

The braking effect is accomplished in applicant's device by a mechanical movement which is as follows: The forward swinging links 4, when the shoe is engaging the traction surface, exert a pull thereon in a forward direction through the medium of the inclined leaf spring. The forked arm 20, on the other hand, is so positioned and connected with respect to the frame and leaf spring respectively as to exert a downward pressure upon said spring when the shoe is in the aforesaid position. This downward force tends to react against the pull of the links and as the forked arm connection with the leaf spring is adjacent the end to which the shoe is secured, the downward pressure on said spring will tend to swing the links forward and downward and at the same time force the shoe down upon the traction surface in a degree proportionate to the pull exerted.

What I claim as my invention is:—

1. In an emergency brake the combination with the frame and spring of a vehicle chassis, of a member secured to said spring, a ground engaging member, means secured to said frame for positioning said ground engaging member, and means for resiliently transmitting stresses from said ground engaging member to said first mentioned member secured to the spring.

2. In an emergency brake the combination with the frame and spring of a vehicle chassis, of a resilient member pivotally suspended from said frame, a ground engaging brake shoe secured at one end of said member, a bracket secured to said spring, and means pivotally secured to said bracket and resilient member respectively for transmitting stresses from said shoe to said spring.

3. In an emergency brake the combination with a frame, spring and axle housing of a vehicle chassis, of an angle bar secured to said spring and housing respectively, a resilient member pivotally suspended at one end from said frame, a ground engaging shoe secured to the free end of said resilient member, and a connection between said resilient member and angle bar respectively for transmitting stresses from said shoe to the axle housing and spring respectively.

4. In an emergency brake the combination with the frame, spring and axle housing of a vehicle chassis, of a member adjustably secured to said spring and housing respectively, a depending link pivotally secured to said member, a depending link pivoted to said frame, a leaf spring pivotally secured in inclined position between said links, a ground engaging shoe secured at the lower end of said leaf spring, and means for raising and maintaining said ground engaging shoe in inoperative position.

5. In an emergency brake the combination with the frame, spring, rear wheel and axle housing of a vehicle chassis, of a leaf spring pivotally connected to said frame forward of said wheel, a ground engaging brake shoe secured to the opposite end of said spring, means secured to said leaf spring adjacent said shoe for transmitting an upward thrust to said housing and spring respectively, a cable for swinging said shoe out of engagement with the ground, and means for operating and releasing said cable.

6. In an emergency brake the combination with the frame and axle housing of a vehicle chassis, of a pair of aligned spaced links of different lengths pivotally secured to said frame and axle housing respectively, a leaf spring pivotally secured between said links in an inclined position, a ground engaging brake shoe secured to the lower end of said leaf spring, and means for swinging said links to raise said shoe out of contact with the traction surface.

7. In an emergency brake the combination with the frame and axle housing of a vehicle chassis, of a depending arm pivotally and adjustably secured to said axle housing, a depending link pivotally secured to said frame and in alignment with said arm, a leaf spring angularly disposed between said arm and link and provided with a curved ground engaging brake shoe at its lower extremity, means for raising said shoe upward into inoperative position, and means for releasing and permitting said shoe to fall downward by its own weight into operative position.

8. In an emergency brake the combination with the parallel frame members and axle housing of a vehicle chassis, of a pair of parallel leaf springs, provided with ground engaging shoes at one end, disposed in angular relation to and directly underneath each of said parallel frame members, projections on the ground engaging surfaces of said shoes, spaced pairs of links pivotally secured adjacent said axle housing and to the frame members respectively for supporting said leaf springs, means for simultaneously lifting said ground engaging shoes to inoperative position, and means for simultaneously releasing and positioning said shoes in operative position.

9. In an emergency brake, the combination with the frame of a vehicle chassis, of a ground engaging brake shoe, an arm angularly disposed below said frame to the lower end of which said brake shoe is secured, a pair of spaced links of different radii pivotally secured to said frame and to said arm respectively for supporting the latter, the shorter link being adapted to exert a pull upon the shoe when the latter is in frictional engagement with the traction surface and the longer link being adapted to force the shoe downward upon the traction surface in a degree proportionate to the amount of pull exerted.

10. In an emergency brake, the combination with the frame of a vehicle chassis, of a ground engaging brake shoe, a resilient arm disposed in acute angular relation with the traction surface relative to forward movement of the vehicle to the lower end of which arm said shoe is secured, a pair of spaced swinging links of different radii for supporting said arm, the shorter link pivotally engaging the upper or free end of the arm and the longer link pivotally engaging the arm intermediate its ends and adjacent the shoe end, the position of said links being such that the shorter link exerts a pull forward upon the upper end of the resilient arm and the longer link presses said arm downward forcing the shoe upon the traction surface and reacting against the pull exerted to swing the shorter link downward.

11. In an emergency brake, the combination with the frame of a vehicle chassis, of a resilient arm disposed below and in angular relation thereto, a ground engaging shoe secured to the lower end of said arm, spaced swinging links of different radii secured to said frame and to said arm respectively, the shorter link being pivotally secured to the upper or free end of said arm and the longer link being pivotally secured adjacent the shoe end, said shorter and longer links being positioned in such a manner with respect to the frame and arm as to exert a forward pull and downward pressing action respectively on the arm to hold the shoe against and force it into the traction surface as the vehicle moves forward.

In testimony whereof I affix my signature.

WALTER J. TAYLOR.